May 3, 1966 W. D. ANDERSON 3,248,793
NAVIGATIONAL INSTRUMENT
Filed Nov. 7, 1962 2 Sheets-Sheet 1
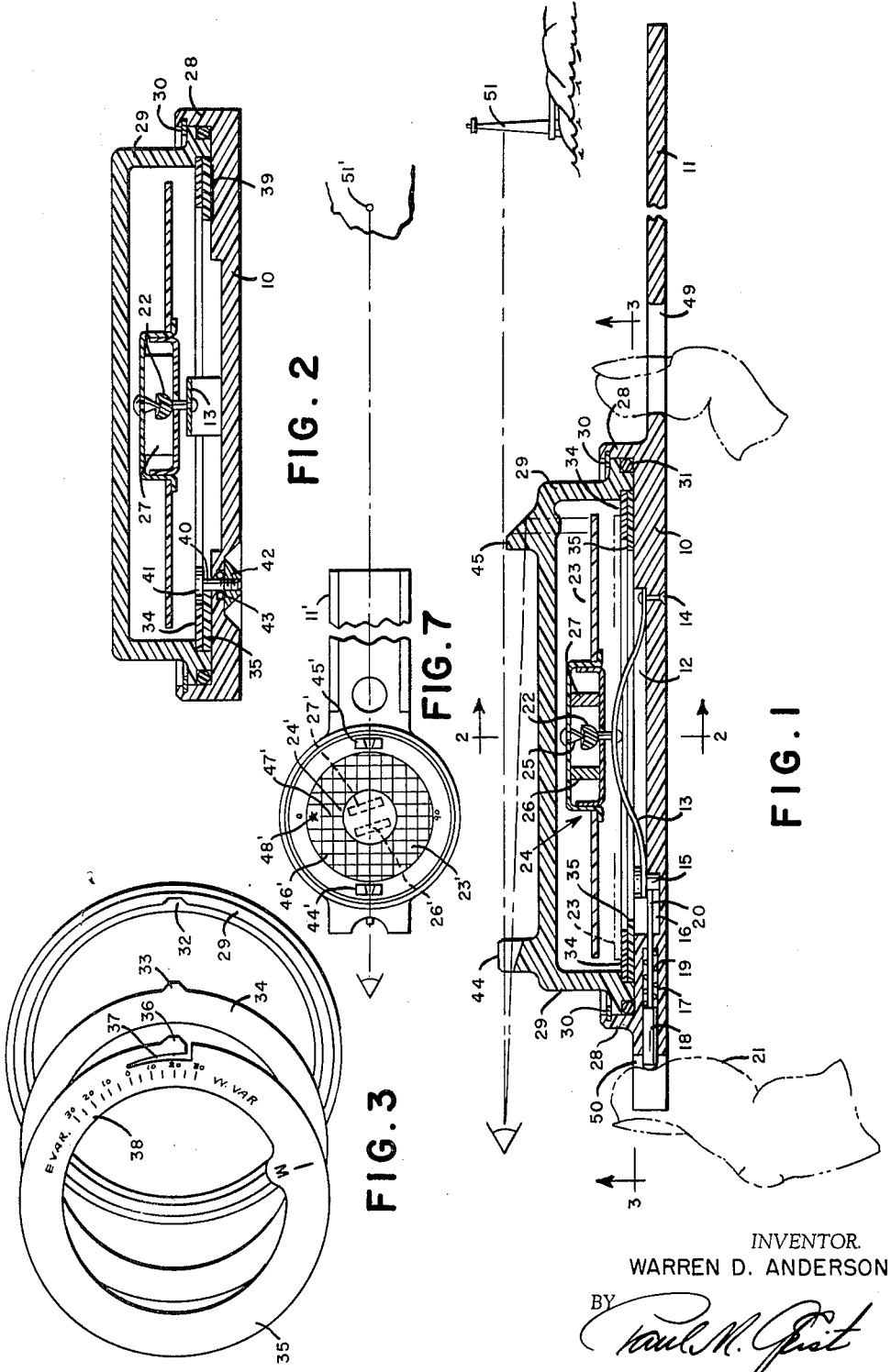
INVENTOR.
WARREN D. ANDERSON
BY
ATTORNEY.

May 3, 1966 W. D. ANDERSON 3,248,793
NAVIGATIONAL INSTRUMENT
Filed Nov. 7, 1962 2 Sheets-Sheet 2

INVENTOR.
WARREN D. ANDERSON
BY
ATTORNEY

United States Patent Office 3,248,793
Patented May 3, 1966

3,248,793
NAVIGATIONAL INSTRUMENT
Warren D. Anderson, 421 Ocean Drive W.,
Stamford, Conn.
Filed Nov. 7, 1962, Ser. No. 235,993
5 Claims. (Cl. 33—67)

This invention relates to navigational instruments and particularly to an improved instrument for determining the bearing of a charted object and plotting the corresponding line of position on a chart.

One of the most frequent navigation problems is that of determining the position of a vessel at sea. On the high seas, celestial or electronic methods are used; however, in coastal waters it is usual for the navigator to directionally determine the bearing of a charted object and then to plot, on the chart, a line of position corresponding to the observed bearing angle and passing through the chart symbol for the object. The intersection of two such lines of position for different objects gives the position of the vessel.

Heretofore, the above procedure required the use of an instrument to determine the bearing angle of a charted object and also an instrument for plotting the line of position on the chart. The instruments used in the past for these purposes have been slow and difficult to manipulate since they required manual setting of the instruments and required the accurate reading of bearing angles, frequently under conditions of poor light and in the presence of wind-blown spray or rain which may preclude the use of corrective eyeglasses.

For example, when using an alidade or a radio direction finder, it is necessary to read the bearing angle from the compass rose and then reset this angle on the compass rose of the chart or on a chart protractor in order to plot the line of position. These steps are time-consuming and subject to error under conditions at sea.

One attempt to eliminate the above problems has been an instrument combining the functions of a pelorus and a chart protractor whereby the bearing angle of the sighted object is transferred mechanically to the chart. This instrument, however, requires manual adjustment and necessitates the reading of compass angles in order to correlate the pelorus card with the ship's compass, and involves the additional problem of maintaining the ship's course unchanged while observing the charted object.

A principal object of this invention is to provide a plotting instrument which completely eliminates the necessity for reading any bearing angles when aligning said instrument with an object and when plotting a line of position on a chart.

A further object of the invention is to provide an instrument which is self-setting to the bearing of an object and can be readily manipulated by one hand.

A further object of the invention is to provide an instrument which may be used as a regular bearing compass.

A still further object of the invention is to provide an instrument which may be used as a chart protractor.

In one aspect of the invention, a base member may have straight edge means integral with it and extending radially from it. The base may support a cone bearing for the card of a magnetic compass in a manner such that the card can be moved away from and toward the base to permit the free magnetic movement of the compass card in one position and to restrain the card from moving in the other position. The compass card preferably is transparent.

In another aspect of the invention, the base may support an adjustable housing that covers and seals the magnetic compass within a compartment formed by the base and housing. The housing may have sighting means mounted on it for sighting an object on land that has a symbol on the chart of the area being navigated.

In still another aspect of the invention, the compass card may be provided with a series of parallel spaced indicia and a separate index indicating the N-axis of the indicia.

In still another aspect of the invention, an index mark representing true north is made on the base along a line parallel to the straight edge, and it is arranged so that it is visible through the transparent compass card.

In a still further aspect of the invention, an adjustable transparent ring may be mounted within the base and concentric with the compass card. This ring may include an index line and a letter "M" representing magnetic north, with said index line being visible through the transparent compass card when a user looks through the sights on the housing. This ring may also include indicia representing the degrees of variation between true and magnetic north, said indicia cooperating with an index line on the base for facilitating calibration of the instrument relative to the variation between true and magnetic north of the area being navigated.

The above, other objects and novel features of the invention will become apparent from the following specification and accompanying drawings which are merely exemplary.

In the drawings:

FIG. 1 is a sectional elevational view of an instrument to which the principles of the invention have been applied;

FIG. 2 is a sectional view taken substantially along line 2—2 of FIG. 1;

FIG. 3 is a view of certain elements of the invention;

FIG. 7 is a partial view of a modified form of the invention.

Figure 4:
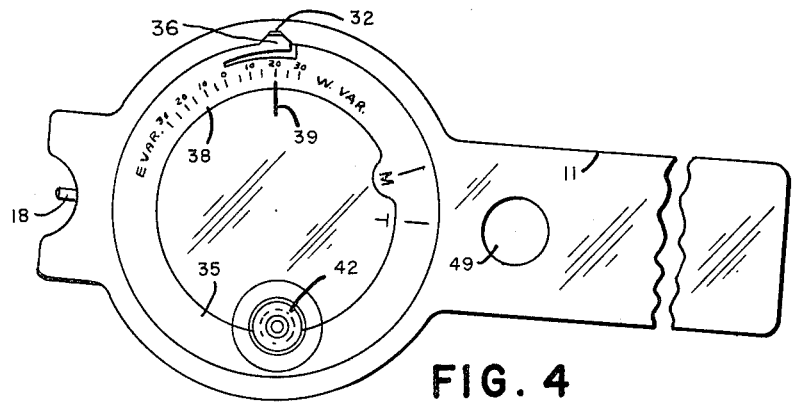
FIG. 4 is a bottom view of the instrument shown in FIG. 1.

Referring to the drawings, the principles of the invention are shown as applied to an instrument including a base 10 having means, which in the embodiment disclosed is shown as an integral straight edge 11, attached thereto and extending therefrom. Of course, other means may be employed such as a separate straight edge means adapted to cooperate with the instrument. The base 10 may include a recessed portion 12 having a resilient element 13 anchored to base 10 by a pin 14. The end of element 13 opposite the pin 14 may include a follower 15 that is adapted to ride within a groove 16 on base 10 that is axially aligned with the element 13.

The base 10 may include a bore 17 within which a plunger 18 may be located, and it may be normally forced leftwardly (FIG. 1) by a spring 19. The plunger is connected to the follower 15 by a rod 20 so that with the plunger pressed inwardly by a finger 21 of the user as shown in FIG. 1, the element 13 is caused to bow as shown in FIG. 1; and when plunger 18 is released, the element 13 flattens out so as to lie near the bottom surface of the recess 12.

The resilient element 13 may have a bearing element 22 attached thereto, which in the embodiment disclosed is shown as cup-shaped. A compass card 23 may be attached to a central housing member 24, to the top of which a bearing element 25 is fixed and which, in the embodiment disclosed, is shown conical in form for cooperation with the cup-shaped bearing element 22. Permanent magnets 26 and 27 may be mounted within housing 24 as is usual in the construction of magnetic compasses.

The base 10 may include a circular, upstanding flange 28 thereon, and a housing member 29 may be held therein for rotary motion relative to base 10 by a snap ring 30. An O-ring 31 may be located between the base 10 and housing member 29 to prevent dirt and water from entering the instrument.

Referring to FIG. 3 which is a view of separated parts, looking in the direction of the arrows and substantially along line 3—3 of FIG. 1, the housing member 29 may include a notch 32 into which a tongue 33 on an annular ring 34 is adapted to register so that both move together when member 29 is rotated relative to base 10. Another annular ring 35 may include a tongue 36 on a portion of ring 35 having a slot 37 therein to provide clearance so that tongue 36 may cam radially inward and disengage notch 32. The tongue 36 is also adapted to be received within notch 32 of member 29 so that ring 35 also normally rotates with housing member 29, but relative rotation between the two may also be effected. All of the members such as 10, 11, 23, 29, 34 and 35 preferably are made from transparent material such as one of the transparent plastics.

The bottom face of annular member 35 may include indicia 38 representing degrees of variation between the true and magnetic north. An index line 39 (FIGS. 2 and 4) may be located on the bottom of base 10 with which the indicia 38 cooperate, as will be explained later. Referring to FIG. 2, a screw 40 may include a head portion 41 adapted partially to overlie the member 35. A nut 42 may be used to lock the annular member 35 to, and release it from, the base 10. An O-ring 43 prevents water or dirt from entering the instrument.

Referring to FIG. 4, it is apparent that the letter "T" and the index 39 on the base 10 or 90° apart; and the 0° mark of indicia 38 and an index "M," both on the ring 35, are 90° apart. Accordingly, by loosening nut 42, housing member 29 and rings 34 and 35 can be turned relative to base 10 so that the correct degree of variation of indicia 38 coincides with index 39. This, of course, separates the indices M and T an equivalent number of degrees. Thus, the instrument is calibrated for the variation corresponding to the area being navigated. The nut 42 is then tightened and the calibration remains fixed while sailing in the area for which the instrument was calibrated.

Referring again to FIGS. 1 and 5, the housing member 29 includes a directional means for orienting the instrument with a charted object, which in the embodiment disclosed in FIGS. 1 and 5 is shown as a sighting element 44, and an optical right-angle prism 45 located along a diameter of the member 29, which diameter includes the index "M" on ring 35 when its tongue 36 is in mesh with notch 32 of member 29. The compass card 23 may be provided with an alignment pattern 46 which in the embodiment disclosed is shown as a rectangular grid arrangement having one radius 47 indexed with a star or other symbol 48 denoting the north axis of the alignment pattern 46. While the alignment pattern is shown as a rectangular grid, it is clear that it may take other forms such as a series of dots, crosses or simply a series of parallel lines or other symbols. For any type of alignment pattern, the north axis of the alignment pattern is defined as that radius of the compass card 23 which points toward the north side of the chart (FIG. 6) and is parallel to a meridian of the chart when the alignment pattern has been aligned with the chart grid.

The card 23 may also be provided with the usual compass rose from 0° to 360° about its periphery, and in the embodiment shown two sets of indicia, reversed relative to each other, are provided so that in sighting through sight 44, the prism 45 will show the inverted indicia correctly to a viewer.

Figure 5:
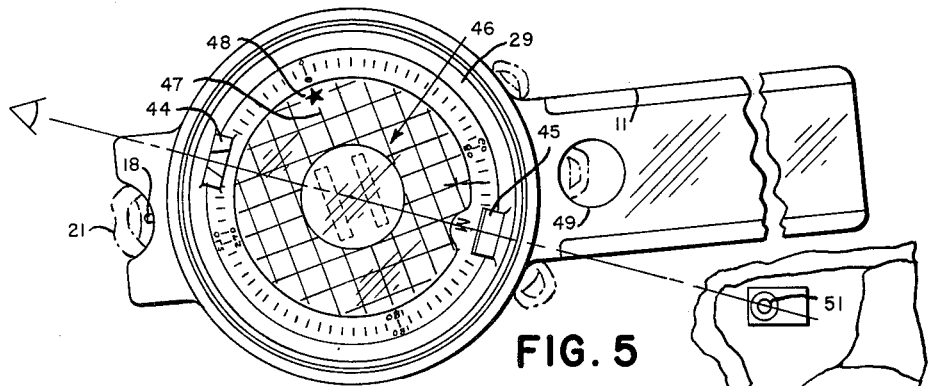
FIG. 5 is a plan view showing the instrument being used to sight on an object.

The base 10 and straight edge 11 are provided with convenient thumb and finger gripping means such as the hole 49 and a thumb notch 50 so that the instrument can be held in one hand as shown in FIG. 5.

Figure 6:
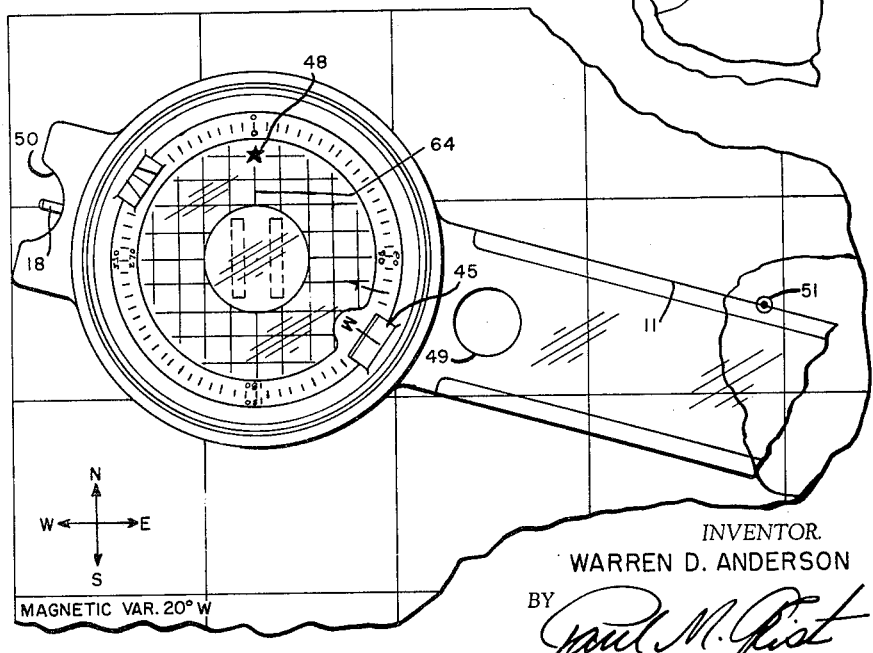
FIG. 6 is a view of the instrument as it is used with a navigational chart.

Referring to FIGS. 5 and 6, every chart of navigable bodies of water includes a symbol identifying the magnetic variation of the areas charted. In FIG. 6, this variation is indicated as 20° W. Accordingly, the instrument is calibrated as previously described by loosening nut 42 and turning housing 29 and annular members 34 and 35, by virtue of tongues 33 and 36 registering with notch 32, until the 20° W. variation index of indicia 38 registers with the index line 39 on the base 10, and then nut 42 is tightened. Referring to FIG. 5, the instrument is held in one hand and the user sights an object 51 on the shore, with the thumb depressing plunger 18. Accordingly, the magnets 26, 27 on the card 23 orient the card 23, and upon releasing plunger 18, card 23 is locked to the annular ring 34.

The instrument is then placed on the chart of FIG. 6 with star 48 toward the north side of the chart, the straight edge 11 passing through the symbol on the chart representing the object 51 on shore, and the instrument is shifted until one of the N-S lines such as 64 of the alignment pattern 46 coincides with, or is parallel to, one of the N-S grid lines on the chart. A line is then drawn on the chart along straight edge 11 passing through symbol 51. Repeating the above procedure relative to another shore object provides another line on the chart of FIG. 6, and the intersection of said lines is the true location of the navigator.

While the line of sight has been used in the present specification to visually orient the instrument relative to a known charted object, it will be evident to one skilled in the art that by using a radio direction finder, the sighting means of the instrument may be aligned with a charted radio transmitter and when so aligned, card 23 can be allowed to orient to its N seeking position and then be locked by releasing pin 18. The instrument would then be placed on the chart as shown in FIG. 6 with the straight edge 11 passing through the charted transmitter to which the direction finder was oriented, the instrument shifted until one of the N-S lines of the alignment pattern 46 coincides with, or is parallel to, one of the N-S grid lines on the chart, and a line is drawn along the straight edge 11.

When the bearing of an object is desired to be read, the instrument is held and sighted as in FIG. 5, with plunger 18 depressed. The bearing angle is then read in prism 45, and in the illustration in FIG. 5, is shown as 125° M. (magnetic).

When the instrument is desired to be used as a chart protractor, it is placed on the chart with one edge of the straight edge 11 passing through any two given points which define the course desired. With the plunger 18 extended so that card 23 is locked to ring 34, housing 29 is rotated, carrying ring 34 and card 23 until the alignment pattern 46 coincides with the grid pattern of the chart. The true course will be indicated under the index "T" (FIG. 6) while the magnetic course will be indicated under the index "M", i.e., 105° and 125°, respectively.

Referring to FIG. 7, a simplified modification of the invention is shown. Elements of FIG. 7 having corresponding elements in FIGS. 1 to 6 will bear the same reference numbers except they will be primed. The line of sight through 44' and 45' is fixed in alignment with a line parallel to the straight edge 11'. The housing member 24' to which the card 23' is attached supports the permanent magnets 26' and 27', and these magnets are angularly displaced relative to the north axis 47' of alignment pattern 46' by an angle equal to the magnetic variation of the area in which the device is to be used. Accordingly, the star 48' represents true north in FIG. 7; whereas the star 48 in FIG. 5 represents magnetic north. In other words, straight edge 11 of FIG. 5 is angularly displaced from the line of sight through 44 and 45 by an amount equal to the magnetic variation; whereas in FIG. 7, the axis of magnets 26' and 27' is angularly displaced from north axis 47' by an amount equal to the magnetic variation.

Although the various features of the improved instrument have been shown and described in detail to fully disclose two embodiments of the invention, it will be evident that changes may be made in such details and certain features may be used without others without departing from the principles of the invention.

What is claimed is:

1. In an instrument for determining the bearing of a charted object and plotting the corresponding line of position on a chart having a grid pattern thereon comprising in combination, a base; straight edge means attached to said base; a magnetic compass mounted on said base including a card adapted to be turned so that one of its radii points to the magnetic north; directional means mounted on said base for orienting the instrument with said object; an alignment pattern on said compass card adapted to cooperate with the grid pattern on said chart, said alignment pattern on said card having a north axis that is displaced from the north seeking radius of the card by an angle equal to the magnetic variation of the area in which said instrument is to be used; and means for selectively locking said card relative to said straight edge means.

2. In an instrument for sighting an object and for plotting the corresponding line of position on a chart having a grid pattern thereon, a base made from transparent material; straight edge means attached to said base; a transparent housing mounted on said base; a magnetic compass within said housing including a transparent card; an alignment pattern on said card having a north axis that is displaced from the north seeking radius of said card by an angle equal to the magnetic variation of said chart; indicia on said base and housing for reading against said card; prismatic sighting means on said housing that is oriented relative to said srtaight edge means; and means for selectively locking said card relative to said straight edge, the construction and arrangement of the parts being such that when said sighting means is aligned with said object, and the compass card is in its north seeking orientation, the angle between said straight edge means and the north axis of said alignment pattern differs from the magnetic bearing of the object by an angle equal to the magnetic variation of said chart.

3. In an instrument for determining the bearing of a charted object and plotting the corresponding line of position on a chart having a grid pattern thereon comprising in combination, a plotting straight edge means; a compass card pivoted relative to said straight edge means and having an alignment pattern thereon oriented relative to the north seeking radius of said card; directional means oriented relative to said straight edge means for orienting the instrument with said object; and means for selectively locking said compass card relative to said straight edge means, the construction and arrangement of the parts being such that when said directional means is aligned with an object, and the compass card is in its north seeking position, the angle between said straight edge means and the north axis of said alignment pattern differs from the magnetic bearing of said object by an angle equal to the magnetic variation of said chart.

4. In an instrument for determining the bearing of a charted object and plotting the corresponding line of position on a chart having a grid pattern thereon comprising in combination, a plotting straight edge means; a compass card pivoted relative to said straight edge means and having an alignment pattern thereon including a north axis that is displaced from the north seeking radius of said card by an angle equal to the magnetic variation of said chart; means for establishing a line of direction parallel to said straight edge means; and means for selectively locking said card relative to said straight edge means.

5. In an instrument for determining the bearing of a charted object and plotting the corresponding line of position on a chart having a grid pattern thereon, comprising in combination, a plotting straight edge means; directional means having an orientation adapted to be fixed relative to said straight edge means for aligning the instrument with said object; a compass card pivoted relative to said straight edge means; an alignment pattern arranged for rotation about the axis of said card, said alignment pattern having a north axis whose orientation may be fixed relative to the north seeking position of said card, the construction and arrangement of the parts being such that when said directional means is aligned with an object, and the alignment pattern is in fixed orientation with respect to the north seeking position of said card, the angle between said straight edge means and the north axis of said alignment pattern differs from the magnetic bearing of said object by an angle equal to the magnetic variation of said chart.

References Cited by the Examiner

UNITED STATES PATENTS

| 1,711,124 | 4/1929 | Otto | 33—72 |
| 2,111,829 | 3/1939 | Winterer et al. | 33—72 |
| 2,246,002 | 6/1941 | Powers | 33—222 |

FOREIGN PATENTS

| 651,439 | 9/1937 | Germany. |
| 5,676 | 12/1883 | Great Britain. |
| 1,220 | 1/1891 | Great Britain. |
| 234,145 | 12/1944 | Switzerland. |

ISAAC LISANN, *Primary Examiner.*

LEONARD FORMAN, *Examiner.*